(12) United States Patent
Jayapalan et al.

(10) Patent No.: US 10,178,233 B1
(45) Date of Patent: *Jan. 8, 2019

(54) MULTIMEDIA NETWORK TRANSPOSITION

(71) Applicant: United Services Automobile Association (USAA), San Antonio, TX (US)

(72) Inventors: Vijay Jayapalan, San Antonio, TX (US); Susan Blake, Helotes, TX (US); Frederick Eugene Diehl, Jr., Cibolo, TX (US); Jerry Scott Beene, Bulverde, TX (US); Michael Sjolander, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,308

(22) Filed: Aug. 30, 2017

Related U.S. Application Data

(63) Continuation of application No. 15/200,249, filed on Jul. 1, 2016, now Pat. No. 9,774,741, which is a continuation of application No. 14/702,354, filed on May 1, 2015, now Pat. No. 9,386,159, which is a continuation of application No. 13/793,661, filed on Mar. 11, 2013, now Pat. No. 9,025,755.

(60) Provisional application No. 61/663,396, filed on Jun. 22, 2012.

(51) Int. Cl.
*H04M 7/00* (2006.01)
*H04M 15/00* (2006.01)
*H04M 3/523* (2006.01)
*H04M 3/51* (2006.01)
*H04L 29/06* (2006.01)

(52) U.S. Cl.
CPC ...... *H04M 3/5235* (2013.01); *H04L 65/1006* (2013.01); *H04M 3/5166* (2013.01); *H04M 3/5191* (2013.01); *H04M 3/5238* (2013.01); *H04M 7/0006* (2013.01); *H04M 15/58* (2013.01)

(58) Field of Classification Search
None
See application file for complete search history.

(56) References Cited

U.S. PATENT DOCUMENTS

| | | | |
|---|---|---|---|
| 6,839,419 B1 | 1/2005 | Flockhart et al. | |
| 7,492,879 B1 * | 2/2009 | Beene | H04M 15/00 370/356 |
| 8,565,409 B1 | 10/2013 | Croak et al. | |
| 9,025,755 B1 * | 5/2015 | Jayapalan | G06Q 10/10 379/114.02 |

(Continued)

OTHER PUBLICATIONS

U.S. Appl. No. 61/663,396, filed Jun. 22, 2012, Multimedia Network Transposition.

(Continued)

*Primary Examiner* — Quoc D Tran
(74) *Attorney, Agent, or Firm* — Perkins Coie LLP

(57) ABSTRACT

Methods and systems for routing multimedia traffic are described. A method may include receiving a communication originating from a user, transposing an alias transport network over one or more existing networks to route the communication, and routing the communication based on mapping rules.

20 Claims, 5 Drawing Sheets

(56) References Cited

U.S. PATENT DOCUMENTS

| | | |
|---|---|---|
| 9,386,159 B1 | 7/2016 | Jayapalan et al. |
| 9,774,741 B1 | 9/2017 | Jayapalan et al. |
| 2003/0021264 A1 | 1/2003 | Zhakov et al. |
| 2004/0213400 A1 | 10/2004 | Golitsin et al. |
| 2006/0210047 A1 | 9/2006 | Neyman et al. |
| 2007/0047706 A1* | 3/2007 | Starling ................ H04M 15/00 379/114.03 |
| 2011/0044184 A1* | 2/2011 | Balasaygun ............ G06F 9/543 370/252 |
| 2011/0083174 A1 | 4/2011 | Aldridge et al. |

OTHER PUBLICATIONS

U.S. Appl. No. 13/793,661, filed Mar. 11, 2013, Multimedia Network Transposition.
U.S. Appl. No. 14/702,354, filed May 1, 2015, Multimedia Network Transposition.
U.S. Appl. No. 15/200,249, filed Jul. 1, 2016, Multimedia Network Transposition.

\* cited by examiner

MULTIMEDIA NETWORK TRANSPOSITION

CROSS-REFERENCE TO RELATED APPLICATIONS

This application is a continuation of U.S. patent application Ser. No. 15/200,249, filed Jul. 1, 2016, now allowed, which is a continuation of U.S. patent application Ser. No. 14/702,354, filed May 1, 2015, now U.S. Pat. No. 9,386,159, which is a continuation of U.S. patent application Ser. No. 13/793,661, filed on Mar. 11, 2013, now U.S. Pat. No. 9,025,755, which claims the benefit of U.S. Provisional Application No. 61/663,396, filed on Jun. 22, 2012, which are hereby incorporated by reference for all purposes in their entireties.

TECHNICAL FIELD

Various embodiments of the present disclosure generally relate to the field of telecommunications. More specifically, various embodiments of the present disclosure relate to using an alias network to route multimedia traffic to an enterprise using enterprise routing rules or an enterprise routing engine.

BACKGROUND

Business enterprises have historically made toll free telephone numbers available to their customers or other parties to contact the enterprise to ask questions, resolve issues, request information, conduct business, or for other reasons. Toll free numbers allow callers to contact the enterprise without the caller being charged for the call. The charge for using a toll free number is typically paid by the enterprise being called. Toll free numbers have proven to be useful tools for customer service, telemarketing, and other types of customer/enterprise contact. Calls to an enterprise routed over a toll free network may be routed over other toll free networks in the process of delivering the call to its final destination. The enterprise may have various member service centers or call centers located in different geographies and a call may be routed to multiple locations before being completed. For large enterprises that have a significant customer service component, the costs associated with routing calls to multiple destinations and providing toll free services can become large.

The landscape for individually tolled long distance communications is changing. In many cases, customers use cellular phones to contact an enterprise. Cellular phone calling plans are often structured such that there is no additional charge for or distinction made between a call within the caller's local calling area and a long distance call. In other words, cellular telephone customers pay for a particular amount of usage, often measured in minutes, and there is no additional charge if these calling minutes are used to make long distance calls or calls to other area codes. At the same time, a growing number of customers are using voice over internet protocol (VOIP) phones or other types of network based communications in lieu of voice calls using the public switched telephone network (PSTN). An enterprise may receive incoming calls or communication requests in many different forms using different protocols and/or different applications. These interactions may all be directed to a single toll free number, a small number of toll free numbers, and/or a single network entry point. Once received, the enterprise may route or re-route the communication in a number of different ways. This routing may include charges to the enterprise for transferring the incoming communication to other networks and/or charges for use of these other networks.

SUMMARY

Methods and systems for transposing an alias network over one or more existing networks are provided. The alias network may be operated using a set of enterprise defined rules. Incoming communications may be routed over the alias network and/or other networks based on the enterprise defined rules. The alias network may also be comprised of elements of the one or more existing networks. Using the enterprise defined rules, an enterprise can control routing of the incoming communication at or near the communication entry point. In this way, the enterprise may route the incoming communications in many different ways to accomplish different objectives. These objectives may include reducing costs, balancing traffic, adjusting workloads, or providing varied levels of service. The enterprise defined rules may be dynamically adjusted to accommodate changing objectives or operating conditions.

BRIEF DESCRIPTION OF THE DRAWINGS

Embodiments of the present disclosure will be described and explained through the use of the accompanying drawings.

Figure 1:
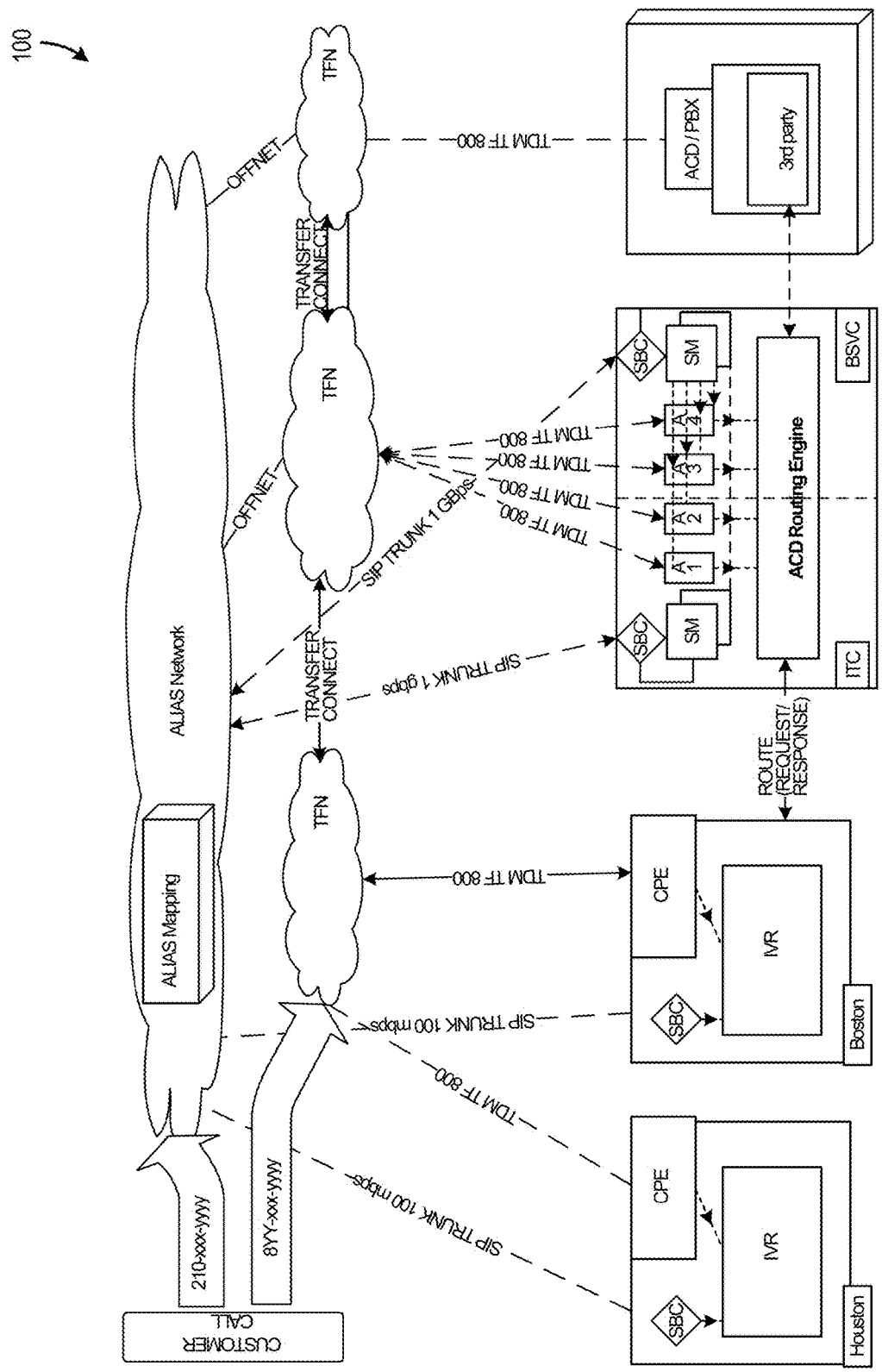
FIG. 1 illustrates an example of an operating environment in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all possible modifications, equivalents, and alternatives.

DETAILED DESCRIPTION

Various embodiments of the present disclosure generally relate to the field of telecommunications. More specifically, various embodiments of the present disclosure relate to using an alias network to route calls or multimedia traffic to an enterprise using enterprise routing rules or an enterprise routing engine.

The embodiments below are primarily described with respect to a customer calling a customer service center of an enterprise. The intention, however, is not to limit the disclosure to this implementation. The disclosure may also be applied to other types of communications, other types of communication paths, and other types of communication destinations. In the following descriptions, for the purposes of explanation, numerous specific details are set forth in order to provide a thorough understanding of the embodiments of the present disclosure. It will be apparent, however, to one skilled in the art that embodiments of the present disclosure may be practiced without some of these specific details.

As used herein, the term 'toll free' is used to describe services for which there is typically no incremental cost to a calling customer. These 'toll free' calls do typically have costs associated with them that are incurred by the enterprise being called or the owner of the toll free number. These costs are referred to as "tolls" in this disclosure.

In some embodiments, an enterprise transposes an alias transport network over one or more existing networks to route calls to one or more customer contact centers. In some embodiments, the calls are routed using a set of mapping rules implemented in the alias network and determined and/or controlled by the enterprise. The mapping rules may take multiple factors regarding the call into account including: the number called, the type of call, the application used to initiate the call, the identity of the caller, the account history of the caller, the call history of the caller, the identity of the calling device, a call origin, locations of one or more customer service centers, workloads of one or more customer service centers, the status of one or more networks, the status of one or more systems within the enterprise.

The mapping rules may further take into account the subject matter, content, or purpose of the incoming communication. In the case of voice calls, the subject matter, content, or purpose of the incoming communication may be determined using an interactive voice response (IVR) system. The IVR system enables the customer to provide information or make choices using voice recognition or dual-tone multi-frequency (DTMF) signaling. The IVR system may be implemented at one or more enterprise sites to distribute incoming communications throughout a site or may also distribute calls across multiple sites. Although IVR related functions may optionally also be implemented within the alias network, it should be understood that the IVR and the transport of communications in the alias network may be implemented separately.

For incoming communications other than voice calls, the subject matter, content, or purpose of the call may be determined based on information provided by or retrieved from the customer. For example, a multimedia communication application may enable the customer to provide a text entry or provide information regarding the subject of the communication in some other manner. In another example, a graphical user interface associated with the application may enable the customer to select from among choices that provide more information. The additional information associated with the customer's choices is transmitted in conjunction with the communication to the destination. This information can be further used to make call routing and handling decisions.

The terms "mapping," "mapping rules," "routing rules," "routing table," "enterprise mapping rules," "routing logic," and "routing information" are variously and interchangeably used herein to describe information used by the alias network to make routing determinations.

Having described embodiments of the present disclosure generally, attention is directed to FIG. 1 which illustrates an operating environment 100 in which some embodiments of the present disclosure may be utilized. Traditionally, customers often call an enterprise or a customer service center using a toll free number. In the case of a large enterprise, the call may be routed to a number of different locations or routed in a number of different ways.

For example, many enterprises use one or more IVRs. An IVR allows the customer to interact with the enterprise's computer systems using speech recognition or using a telephone keypad. The IVR may use prerecorded audio, dynamically generated audio, or both, to provide information to the customer or to indicate how the interaction will proceed. The IVR often has access to other computer systems or databases that contain enterprise information, information about the customer, or other information that may be useful in addressing customer requests. As illustrated in FIG. 1, some large enterprises may have multiple IVRs in different geographic locations. The number and location of the IVRs may be chosen based on geographic concentrations of customers, locations of customer service centers that calls get routed to, communications costs to/from various regions, redundancy, to provide protection against natural disasters, or based on other factors. Traditionally, the customer call is transferred to the IVR over a toll free time division multiplexed (TDM) communication line.

In some cases, an entire interaction can be accomplished through interaction with an IVR (i.e., a customer requests an account balance and the IVR retrieves and provides the balance). In other cases, the IVR is used to gather further information from the customer that is used to determine a final destination to which the call should be routed. For instance the IVR may determine that a call is related to a particular product and the call must be routed to a customer service center or call center that is currently receiving calls regarding that product. In some cases, call routing tables may be dynamic and may be updated frequently to reflect workloads and call wait times at various customer service centers. IVRs may include various other types of communication equipment such as a gateway, customer premise equipment (CPE), a session border controller (SBC), or another device for managing calls or other types of electronic communications. CPE may include devices such as telephones, telephone equipment, routers, switches, residential gateways, set-top boxes, fixed mobile convergence products, networking adaptors, or internet access gateways that enable access to communications service providers' services and distribute them through a facility.

If a call or customer request cannot be completed at the IVR, the call is often transferred elsewhere in the communication system based, at least in part, on additional information gathered by the IVR. In some cases, the call is then transferred to an automatic call distributor (ACD) system. An enterprise may have one or more ACD systems associated with each of one or more customer service centers. The ACD uses an ACD routing engine to distribute incoming calls to a specific group of terminals used by call agents. ACD systems are often used to handle large volumes of incoming calls from callers who do not need to talk to a specific call agent, but who require assistance from the soonest available call agent.

The ACD routing engine transfers the received call to a specific call agent using various algorithms and decision criteria. Once transferred, a toll free call has been established between the customer and the call agent. This call may utilize one, two, or more toll free networks. If the enterprise is using multiple ACD routing engines, these routing engines may communicate between each other for purposes of determining status, workload balancing, or for improving call routing. In addition, the ACD routing engine may be in communication with one or more IVRs, one or more third parties, and/or related companies that also receive or process communications on behalf of the enterprise. Calls may flow over multiple networks for redundancy purposes, to augment capacity on top of a fixed capacity of a service provider, or for other reasons. The flow between networks can be controlled by enterprise rules and can be selected to reduce costs.

The ACD system may also include a number of other components. For example, the ACD system may include an SBC and a session manager (SM) for handling calls received using session initiation protocol (SIP). SIP is a signaling protocol used for controlling communication sessions such as voice and video calls over Internet Protocol (IP). A SIP call may be established by a number of different types of devices or applications having IP capability. These calls may be delivered to the destination using SIP trunking. SIP trunking is a VOIP and streaming media service based on SIP in which service providers deliver telephone services and unified communications to an enterprise equipped with a SIP PBX. SIP based communications may include voice, video, and other streaming media applications such as computer desktop sharing, web conferencing, and whiteboard sharing. The ACD system may also include a broadcast switched virtual connection (BSVC) and/or a connection to an independent telephone company (ITC).

The various communications systems described herein that are operated by or on behalf of the enterprise may also include one or more private branch exchanges (PBXs). A PBX makes connections among the internal telephones of the enterprise and connects them to the PSTN or other communications lines via trunk lines.

Embodiments of the present disclosure are directed at transposing an alias network over one or more existing carrier networks to improve call routing and minimize costs. The existing carrier networks may include a PSTN, an over the top (OTT) network, a toll free network, a dedicated network, another network, or combinations thereof. The alias network uses one or more of these existing networks, and possibly other network components, to route calls or other communications more efficiently and/or more cost effectively. The alias network may also include additional communication equipment or software.

In one embodiment, the enterprise establishes call routing information in the alias network. This call routing information can be used to make the various types of call routing decisions described herein. By placing the call routing information and/or the call routing decision making process at or near the entry point of the call, some routing steps or costs may be avoided. An incoming toll free call may not have to be transferred over a toll free line to make a determination about how the call should be dispatched. The routing for a call received at the alias network may be determined at or near the entry point to the alias network and the call may be transferred to its destination over an SIP trunk. Calls transferred over the SIP trunk will typically not incur toll free charges. Calls may be transferred to an IVR over a SIP trunk and/or may be transferred to an ACD using a SIP trunk. In some cases, a cloud IVR may be used such that some or all of the IVR processes may be performed in the alias network or in a nearby network.

Using the alias network as described herein can reduce call costs in multiple ways. First, costs may be reduced by leveraging alias network delivery. Second, costs may be reduced by maximizing use of resources for which the costs have already been incurred and/or using the lowest cost resources. Third, by deploying routing tables or other types of routing information in the alias network or in carrier's networks, the number of call transfers or transfer connects may be reduced. Advantageously, the alias network may be able to use the routing information to route the call directly to its destination without first transferring it to the one or more intermediate destinations. In addition to the other cost benefits discussed above, eliminating destinations and transfers will typically reduce the overall transport cost of the call. The alias network may also make use of SIP connections to route the call to the final destination thereby further reducing costs. The call routing performed by the alias network may make distinctions between incoming communications based on the E.164 numbers (E.164 NUmbers Mapping (ENUM) standard is telephone number mapping system that uses special Domain Name System (DNS) record types to translate a telephone number into a Uniform Resource Identifier) or these distinctions may be made using some other method.

In some cases, calls which are routed to one ACD or customer service center may ultimately end up being routed to another ACD or customer service center due to workloads or increased call wait times. Implementing the call routing information, call routing logic, or call mapping information in the alias network or in a carrier network, reduces or eliminates these types of transfers between customer service centers and/or ACDs if the call routing information is dynamically updated. The call routing information, call routing logic, or call mapping information does not have to be stored in the alias network. The alias network, or some component of a carrier network, may query this information from within one or more systems of the enterprise.

An administrator of the enterprise or a party operating the system on behalf of the enterprise may have an interface to update, change, or adjust the call routing logic as frequently as needed to manage the routing of calls. This interface may be a graphical user interface (GUI) that is accessible from a number of locations. The interface may be used in conjunction with or combined with monitoring tools that enable the administrator to monitor call traffic and routing, including historical views. These routing adjustments can occur frequently in order to reduce the number of calls which are routed to one location and end up having to be routed to another location. The routing decisions and adjustments may be made to reduce cost, reduce bandwidth usage, and/or reduce equipment needs.

In some embodiments, one or more of the involved carriers may also have control over the enterprise-defined call routing. For example, one or more of the carriers may have the authority to review or approve changes to the mapping before it is implemented. In another example, the enterprise may define the mapping by choosing from predefined options or choices that have been provided by the carrier.

Depending on call volumes, call types, and system utilization, the alias network may still make use of other networks, including one or more toll free networks, for delivering calls. For example, the alias network may use a network outside of the alias network to deliver a call to a destination if the destination cannot be reached using components of the alias network. In another example, the alias network may route a call using another network if resources are not currently available in the alias network. The alias network may also make use of other network components for call routing in response to expected equipment downtime or unexpected equipment failure. In other words, the traditional network delivery routes may still be used for purposes of redundancy or may be used as a failover option for the alias network. The alias network may also manage resource utilization by using one network to handle overflow from another.

It should be understood that the functions described herein as being performed by an administrator may also be performed in automated fashion. For example, a system may monitor operation characteristics of one or more systems within the enterprise or network and automatically make adjustments to the call routing or mapping based on an algorithm.

A call may be delivered using a combination of elements of the alias network and one or more other networks. However, even if a toll free network is used to deliver the call, an analysis of the best routing of the call may be performed before the call is placed onto the toll free network. The enterprise managed mapping information may also include logic, decision trees, or other decision making parameters relating to how other networks, or components of other networks, will be used with respect to the examples provided above.

In some embodiments, the alias network may be implemented to keep the appearance of a toll free service on the front end. In other words, the customer may still be provided a toll free number to call to initiate the communication. However, the call may be intercepted by the alias network at the nearest possible location to minimize the use of toll free networks in routing the call.

The implementations described herein may be used to flow the same call over multiple networks based on the enterprise rules and/or network constraints. This provides a mechanism for multiple carriers to provide delivery of the same call to an enterprise providing carrier redundancy outside of a carrier implementation. The implementations may also be used to augment capacity on top of a fixed capacity managed by a service provider. The flow between networks can be capacity constrained by enterprise rules and can provide best cost routing mechanisms as well as scale multiple alias networks to account for bursts.

In other embodiments, a toll free number may no longer be provided to the customer. In this case, the customer may dial a non-toll free number to establish the communication and use of this number may directly route the call to the alias network. In some cases, the customer may be using an application or computing device which establishes a connection to the alias network without use of the PSTN and/or without use of an E.164 number. For example, a customer may initiate communication through an application on a computer, smartphone, or tablet.

The alias network may be capable of establishing calls or requests for communication that are initiated or established in many different ways. In some cases, the routing information may instruct the alias network to make routing determinations based, at least in part, on the type of device or application. For example, a communication request may be initiated by the customer through a chat interface or other application that does not require near real time responsiveness as a voice call would. The alias network may detect the type of application or receive information about the application and use this information, in conjunction with the enterprise managed routing information, to make appropriate cost/performance tradeoffs for routing the communication. Various types of communications may be routed in different manners. For example, voice calls may be routed differently than video calls. Even within a category of calls, the calls may be routed differently based on the type of application involved. For example, a Skype voice call may be routed differently than a VOIP call initiated using a different application.

The routing functions performed by the alias network may also be used to accomplish other objectives. For example, two or more quality of service levels may be offered. Different levels of service may be provided based on the customer's identity, the type of product involved, the customer's account balance, the length of time he/she has been a customer, previous call history, or other customer or account related factors. The mapping rules may dictate that a call from a customer meeting one or more criteria in these categories is handled in a distinctive manner. The distinctive manner may include, routing the call to a preferred customer service center, avoiding routing the call to an IVR, routing the call over preferred communication links, or routing the call over networks that are currently performing better than others. In a further example, a recent call history may be checked and a higher level of service may be assigned to a customer who has called recently. A recent call may be indicative of a caller whose call was dropped or a caller with an issue that has not yet been resolved. Many other service level distinctions are possible. An administrator may define these service quality levels in the mapping rules for customers on a categorical and/or individual basis.

The alias network and routing rules may also be configured to provide additional cost benefit to the enterprise by determining characteristics of the caller's calling plan. For example, if the alias network is able to determine that the caller is calling from a number which does or would likely incur additional long distance charges, the alias network may route the call over toll free or other non-toll routes to keep the customer from incurring any tolls. On the other hand, if the alias network is able to determine that any long distance charges would already be included in the caller's flat rate, the alias network may opt to route the call differently and avoid use of toll free networks, if possible. This determination may include receiving additional information from the customer, either directly or indirectly. These factors may be used, in addition to the various other criteria discussed above, to balance loads across various portions of the network or balance use of other system components.

The alias network may also use the routing rules to manage network or system usage to manage costs in other respects. The alias network may have access to contractual information describing agreements between the enterprise and one or more carriers. For example, the enterprise may have an agreement to pay a flat fee to a particular carrier for up to a specified amount of usage on a monthly basis. After that specified usage, the enterprise may pay an incremental or increased rate. Using information about this agreement, the alias network may route calls to increase the likelihood that specified usage will be fully utilized each month and minimize usage of that network for the remainder of the month once that limit has been reached in order to minimize costs. Usage and volume trends may be used to predict or project usage for a period of time in order to attempt to adjust routing to attempt to meet a targeted usage of a particular network for the period of time. In an environment where network rates are frequently changing, the alias network may use the routing rules to make these types of cost-based routing determinations on a dynamic basis.

Figure 2:
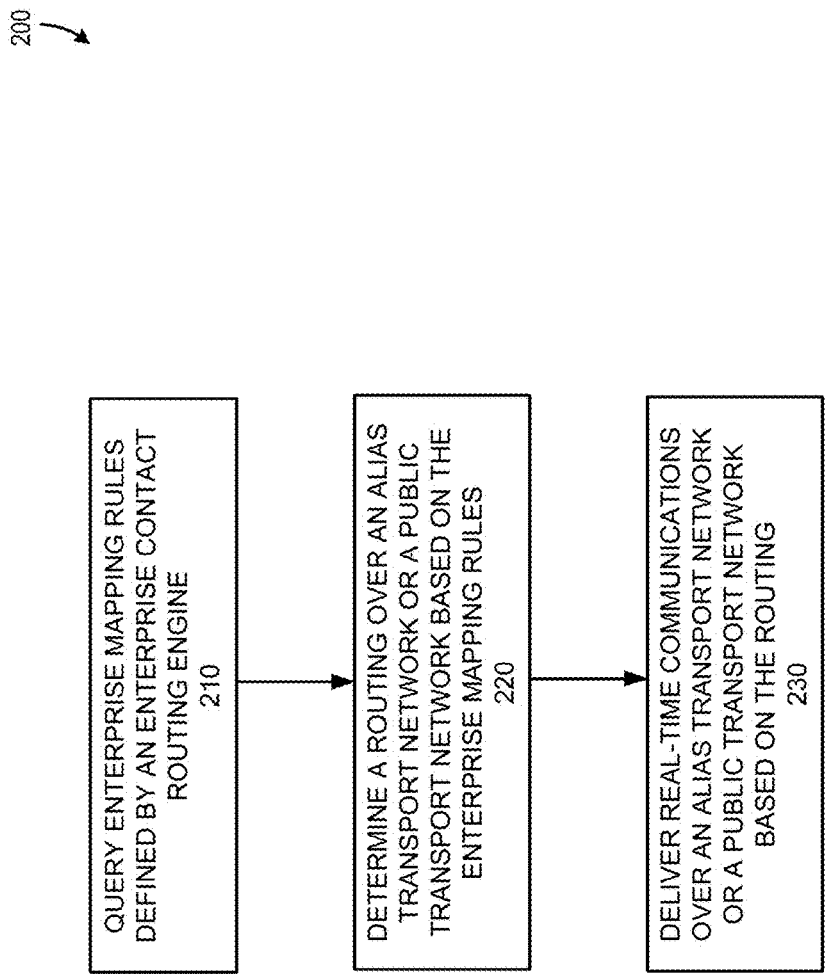
FIG. 2 is a flow chart illustrating a method for performing steps in accordance with various embodiments of the present disclosure.

FIG. 2 illustrates a method 200 performed in a network to accomplish one or more of the advantages described herein. At step 210, enterprise mapping rules defined by an enterprise contact routing engine are queried. Step 220 includes determining a routing over an alias transport network or a public transport network based on the enterprise mapping rules. At step 230, real-time communications are delivered over an alias transport network or a public transport network based on the determined routing.

Figure 3:
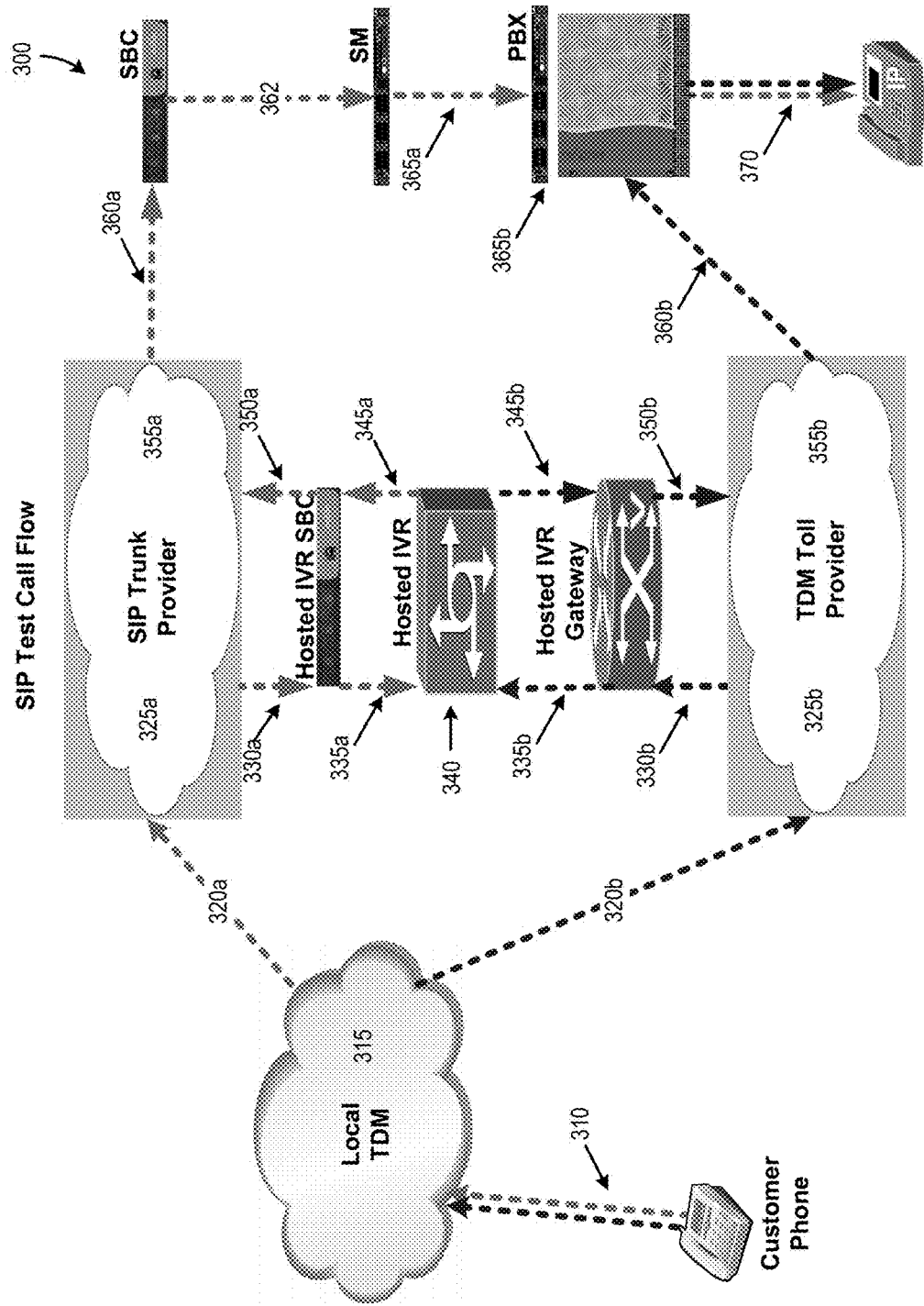
FIG. 3 illustrates example call flows through a system in accordance with various embodiments of the present disclosure.

FIG. 3 illustrates example call flows through a system 300 in accordance with various embodiments of the present disclosure. One of skill in the art will recognize that other embodiments will include more or less equipment and additional or fewer steps.

In operation 310, a customer calls an enterprise directly (e.g., 210-xxx-xxxx) or using a toll free number (e.g., 800-xxx-xxxx). At operation 315, a local TDM provider identifies the call as a SIP Direct Inward Dialing ("DID") number or TDM toll free number for a specific telephone provider and routes it to the corresponding network. Other types of protocols may be used (e.g., IAX2, h323).

When the call is identified as a SIP DID number, the call is routed to the network of a SIP provider in operation 320a. In operation 325a, the SIP provider may identify the DID number as the main pilot number for an enterprise that load balances calls between multiple hosted IVR sites. A hosted IVR site may be chosen based on current capacity of the hosted IVR sites (e.g., call is routed to the hosted IVR site with the least amount of traffic). In operation 330a, the call is routed to a hosted IVR SBC for the chosen hosted IVR location.

In operation 335a, the hosted IVR SBC routes the call to the hosted IVR for self-service (e.g., the customer speaks into the IVR system to direct the call). In operation 340, at the hosted IVR, the customer chooses to speak to a representative and references the enterprise routing platform for a translation routing pool number (e.g., 800-xxx-xxxx) to route the call to the enterprise. The customer may reference the enterprise routing platform by stating a particular reason for calling, such as "Automobile Insurance quote" or "Certificate of Deposit." The hosted IVR sends the translation routing pool number back to the hosted IVR SBC in operation 345a. The hosted IVR SBC routes the call back to the SIP provider, including passing the translation routing pool number in operation 350a.

In operation 355a, the SIP provider looks up the translation routing pool number in an alias table and translates it into a new SIP DID number (e.g., 210-xxx-xxxx) to route the call on a SIP network to the enterprise. In operation 360a, the call is routed on a SIP DID (e.g., 210-xxx-xxxx) and passes the translation routing pool number (e.g., 800-xxx-xxxx) as the automatic number identification (ANI) to the enterprise SBC. The enterprise SBC sends the ANI number (e.g., 800-xxx-xxxx) to an enterprise session manager in operation 362. The enterprise session manager strips the ANI number and translates it into an internal company translation routing pool number (e.g., xxxxx) on the private branch exchange ("PBX") in operation 365a. In operation 370, the internal company translation routing pool number (e.g. xxxxx) queries the enterprise routing platform to obtain the target agent group identified at the hosted IVR when the customer chose to speak with a representative (operation 340) and then sends the call to an available agent.

When the call is identified as a TDM toll free number, the call is routed to the network of the TDM toll provider in operation 320b. In operation 325b, the TDM toll provider identifies the toll call as a TDM trunk call terminating at the hosted IVR. The TDM toll provider routes the call to a hosted IVR gateway in operation 330b.

In operation 335b, the hosted IVR gateway routes the call to the hosted IVR for self-service (e.g., the customer identifies a call destination by speaking into an IVR system). At the hosted IVR, the customer chooses to speak to a representative and references the enterprise routing platform for a translation routing pool number (e.g., 800-xxx-xxxx) to route the call to the enterprise in operation 340. The hosted IVR sends the translation routing pool number back to the hosted IVR gateway in operation 345b. Next, the hosted IVR gateway routes the call and the translation routing pool number back to the TDM toll trunk in operation 350b. The TDM toll provider looks up the translation routing pool number (e.g., 800-xxx-xxxx) and routes it to the enterprise toll TDM trunk in operation 355b.

In operation 360b, the TDM toll provider routes the call to the enterprise TDM trunk and passes the ANI number (e.g., 800-xxx-xxxx) to the PBX. In operation 365b, the PBX strips the ANI number 800-xxx-xxxx and translates it to the internal translation routing pool number on the PBX. In operation 370, the internal company translation routing pool number (e.g., xxxxx) queries the enterprise routing platform to obtain the target agent group identified at the hosted IVR when the customer chose to speak with a representative and then sends the call to an available agent.

Figure 4:
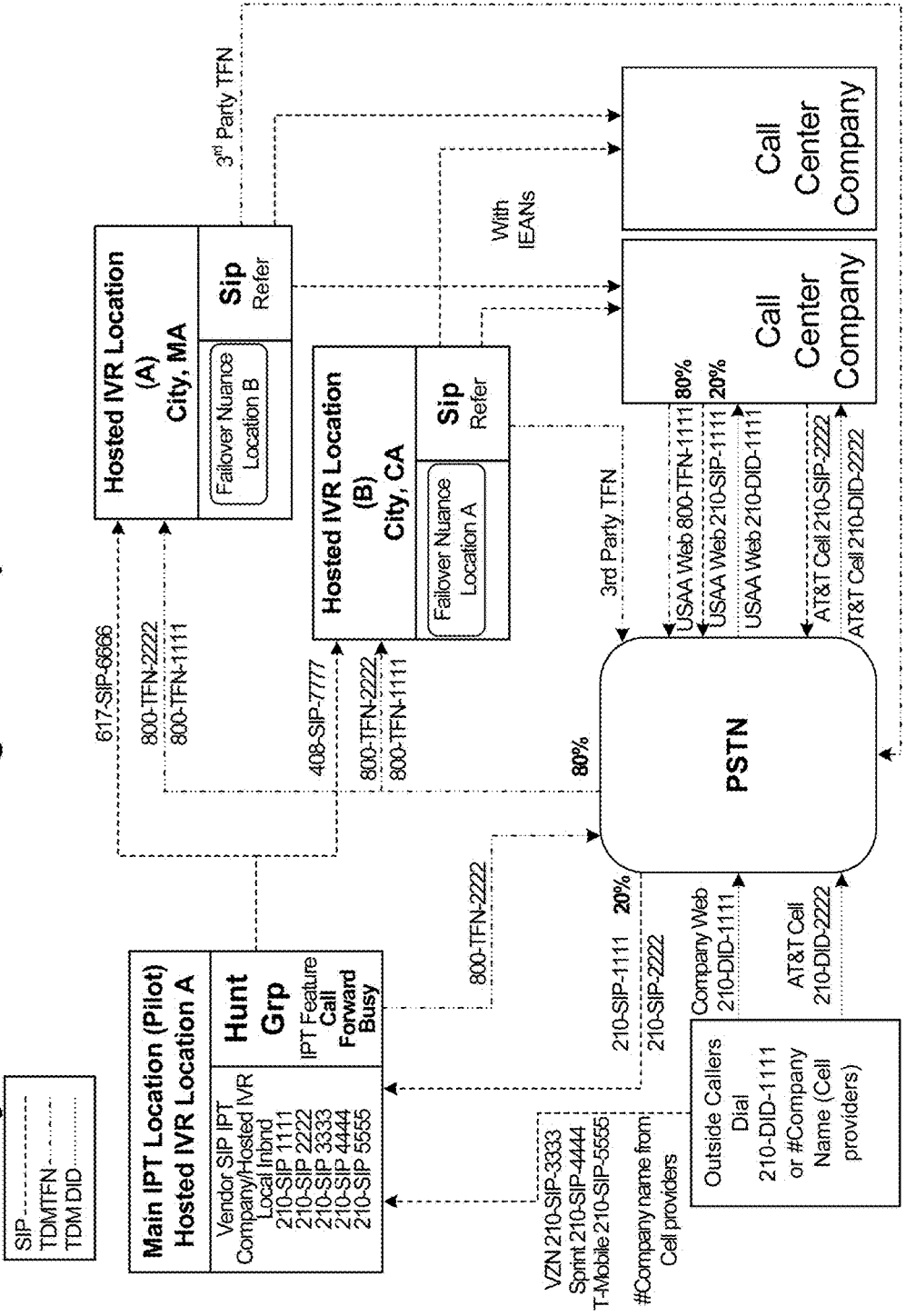
FIG. 4 illustrates an example of dynamic call routing to multiple hosted IVR locations in accordance with various embodiments of the present disclosure.

FIG. 4 illustrates an example of dynamic call routing to multiple hosted IVR locations. The provider of the time division multiplexed toll-free network (TDMTFN) charges the enterprise based on usage, whereas the provider of the SIP network and the time division multiplexed direct inward dialing (TDM DID) generally charge the enterprise based on capacity. Thus, the more calls that are directed to the SIP network versus the TDMTFN network when there is capacity on the SIP network, the more cost-effective for the enterprise.

In the example shown in FIG. 4, a caller dials in and the call is routed either on a SIP network or on a TDMTFN based on a provider of the call or the number dialed. The calls routed on the SIP network are routed to a main IPT location. Depending on capacity, or other enterprise routing rules, the call is routed through the SIP network to a hosted IVR location (e.g., A or B) or the call is routed over the TDMTFN to the PSTN. Routing the call from the SIP network to the PSTN via the TDMTFN may be a backup, used, for example, when the SIP network is at capacity, the caller will be provided a busy signal, or the wait is too long, etc. From the hosted IVR locations, the calls are routed to a third party TFN or straight to a call center of the enterprise. Calls received by the PSTN are routed to an enterprise call center depending on the provider of the caller's device (e.g., AT&T) or type of traffic (e.g., web). Other calls received by the PSTN are directed via the TDMTFN to the hosted IVR locations. When calls are directed to the PSTN, the calls may be redirected to the hosted IVR locations via the TDMTFN network.

Computer System Overview

Figure 5:
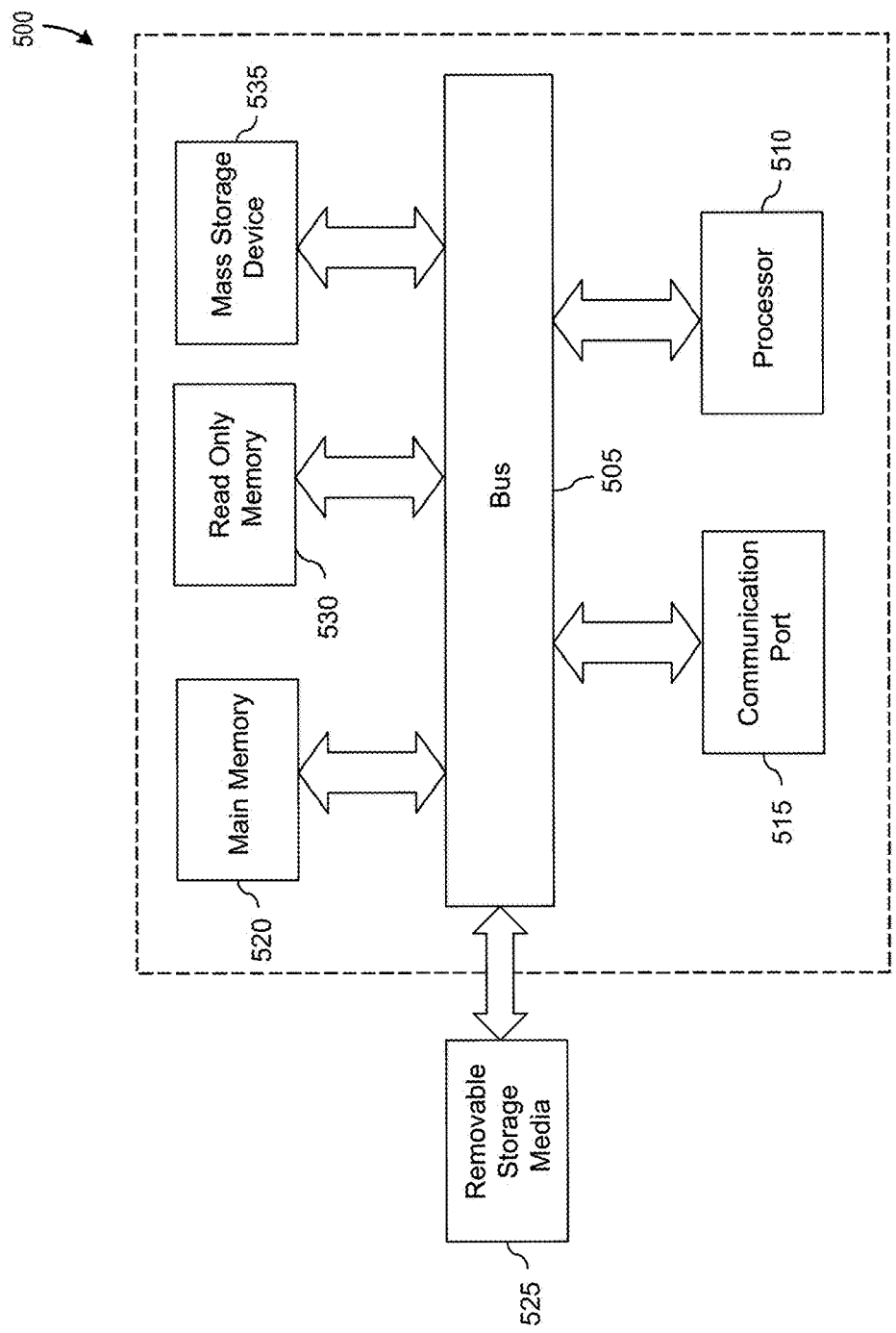
FIG. 5 is an example of a computer system with which embodiments of the present disclosure may be utilized.

Embodiments of the present disclosure include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware. As such, FIG. 5 is an example of computer system 500 with which embodiments of the present disclosure may be utilized. According to the present example, the computer system includes a bus 505, at least one processor 510, at least one communication port 515, a main memory 520, a removable storage media 525, a read only memory 530, and a mass storage device 535.

Processor(s) 510 can be any known processor, such as, but not limited to, an Intel® Itanium® or Itanium 2® processor(s), or AMD® Opteron® or Athlon MP® processor(s), or Motorola® lines of processors. Communication port(s) 515 can be any of an RS-232 port for use with a modem based dialup connection, a 10/100 Ethernet port, or a Gigabit port using copper or fiber. Communication port(s) 515 may be chosen depending on a network such a Local Area Network (LAN), Wide Area Network (WAN), or any network to which the computer system 500 connects.

Main memory 520 can be Random Access Memory (RAM), or any other dynamic storage device(s) commonly known in the art. Read only memory 530 can be any static storage device(s) such as Programmable Read Only Memory (PROM) chips for storing static information such as instructions for processor 510.

Mass storage device 535 can be used to store information and instructions. For example, hard disks such as the Adaptec® family of SCSI drives, an optical disc, an array of disks such as RAID, such as the Adaptec family of RAID drives, or any other mass storage devices may be used.

Bus 505 communicatively couples processor(s) 510 with the other memory, storage, and communication blocks. Bus 505 can be a PCI/PCI-X or SCSI based system bus depending on the storage devices used.

Removable storage media 525 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the disclosure, as they are only examples.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "in some examples," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, telecommunication networks, financial networks, service provider networks, private networks, Internet Service Provider (ISP) networks, and/or PSTNs, interconnected via gateways operable to facilitate communications between and among the various networks.

Embodiments of the present disclosure may be provided as a computer program product which may include a non-transitory machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present disclosure are described with reference to an enterprise providing a customer service function, embodiments of the present disclosure are equally applicable to various other types of business entities.

Also, for the sake of illustration, various embodiments of the present disclosure have herein been described in the context of computer programs, physical components, and logical interactions within modern computer networks. Importantly, while these embodiments describe various aspects of the disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead exemplary. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, instructions, and arrangements for transposing an alias transport network over existing carrier networks. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations, together with all equivalents thereof. Therefore, the above description should not be taken as limiting the scope of the disclosure.

What is claimed is:

1. A method of routing a communication, comprising:
receiving a toll-free call from a caller;
determining a routing of the toll-free call over a first communications network or a second communications network based on enterprise routing rules;
determining a quality of service for the toll-free call based at least in part on a call history of the caller,
wherein a provider of the first communications network charges based on capacity,
wherein a provider of the second communications network charges based on use; and
routing the toll-free call over the first communications network or the second communications network based on the enterprise routing rules and the quality of service for the call.

2. The method of claim 1, wherein routing the toll-free call over the first communications network includes delivering the toll-free call to a destination with an identifier, wherein the identifier is a toll-free number associated with an enterprise.

3. The method of claim 1, further comprising routing the toll-free call over the first communications network regardless of the capacity of the first communications network.

4. The method of claim 1, further comprising routing the toll-free call over the second communications network when the first communications network does not have capacity for the toll-free call.

5. The method of claim 1, wherein the first communications network is a session initiated protocol network, and wherein the second communications network is a toll-free network.

6. The method of claim 1, wherein the destination is an enterprise, wherein the identifier is a toll-free number associated with the enterprise, wherein the enterprise uses a legacy set of switches, and wherein the switches use the toll-free number to direct the toll-free call.

7. The method of claim 1, wherein determining the routing of the toll-free call is based at least in part on a type of device making the toll-free call.

8. A non-transitory, computer-readable storage medium containing a set of instructions that, when executed by one or more processors, cause a machine to:
receive a toll-free call from a caller;
determine a routing of the toll-free call over a first communications network or a second communications network;
determine a quality of service for the toll-free call based at least in part on a call history of the caller,
wherein a provider of the first communications network charges based on capacity,
wherein a provider of the second communications network charges based on use; and
route the toll-free call over the first communications network or the second communications network based on the enterprise routing rules and the quality of service for the call.

9. The non-transitory, computer-readable storage medium of claim 8, wherein the set of instructions that, when executed by the one or more processors, cause the machine to route the toll-free call over the first communications network further cause the machine to deliver the toll-free call to a destination with an identifier, wherein the identifier is a toll-free number associated with an enterprise.

10. The non-transitory, computer-readable storage medium of claim 8, wherein the set of instructions, when executed by the one or more processors, further cause the machine to route the toll-free call over the first communications network regardless of the capacity of the first communications network.

11. The non-transitory, computer-readable storage medium of claim 8, wherein the set of instructions, when executed by the one or more processors, further cause the machine to route the toll-free call over the second communications network when the first communications network does not have capacity for the toll-free call.

12. The non-transitory, computer-readable storage medium of claim 8, wherein the first communications network is a session initiated protocol network, and wherein the second communications network is a toll-free network.

13. The non-transitory, computer-readable storage medium of claim 8, wherein the destination is an enterprise, wherein the identifier is a toll-free number associated with the enterprise, wherein the enterprise uses a legacy set of switches, and wherein the switches use the toll-free number to direct the toll-free call.

14. The non-transitory, computer-readable storage medium of claim 8, wherein determining the routing of the toll-free call is based at least in part on an application used to initiate the communication.

15. A system for routing communication comprising:
an enterprise routing engine operable to:
determine a routing of a toll-free call, the routing over a first communications network or a second communications network;
determine a quality of service for the toll-free call based at least in part on a call history of a caller of the call,
wherein a provider of the first communications network charges based on capacity,
wherein a provider of the second communications network charges based on use; and
route the toll-free call over the first communications network or the second communications network based on the enterprise routing rules and the quality of service for the call.

16. The system of claim 15, wherein the enterprise routing engine is further operable to deliver the toll-free call to a destination with an identifier when the toll-free call is routed over the first communications network, wherein the identifier is a toll-free number associated with an enterprise.

17. The system of claim 15, wherein the enterprise routing engine is further operable to route the toll-free call over the first communications network regardless of the capacity of the first communications network.

18. The system of claim 15, wherein the enterprise routing engine is further operable to route the toll-free call over the second communications network when the first communications network does not have capacity for the toll-free call.

19. The system of claim 15, wherein the first communications network is a session initiated protocol network, and wherein the second communications network is a toll-free network.

20. The system of claim 15, wherein the destination is an enterprise, wherein the identifier is a toll-free number associated with the enterprise, wherein the enterprise uses a legacy set of switches, and wherein the switches use the toll-free number to direct the toll-free call.

* * * * *